Sept. 14, 1926.
E. L. SCHUMACHER
1,599,843
OPHTHALMIC MOUNTING
Filed March 30, 1925
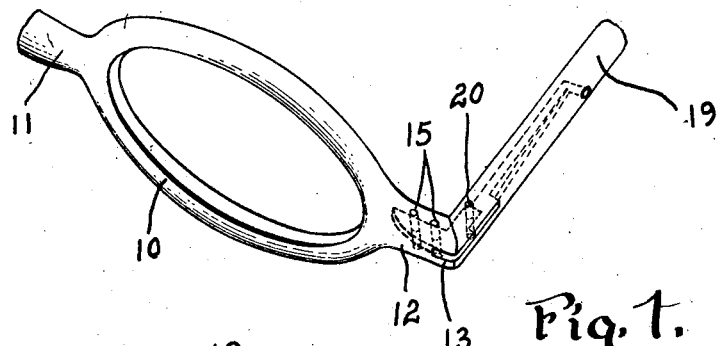
Fig. 1.
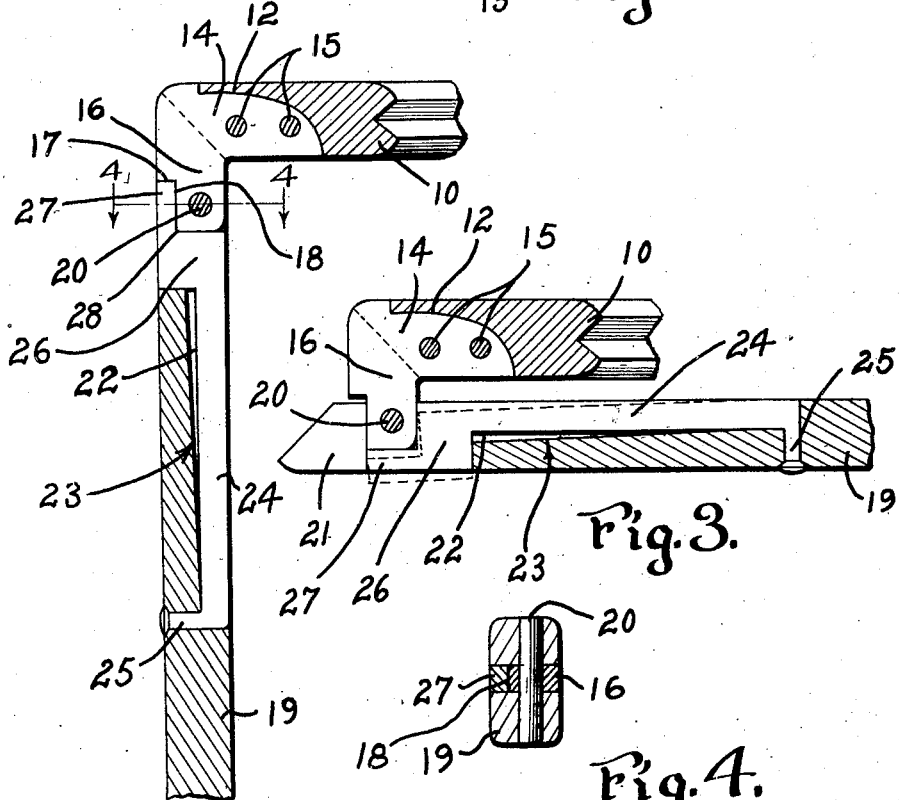
Fig. 3.
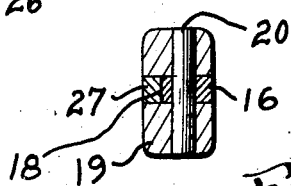
Fig. 4.
Fig. 2.
Inventor
Elmer L. Schumacher.
By Harry H. Styll
Attorney Patented Sept. 14, 1926.

1,599,843

UNITED STATES PATENT OFFICE.

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed March 30, 1925. Serial No. 19,409.

This invention relates to improvements in ophthalmic mountings, and has particular reference to the provision of an improved temple connection for spectacles and the like.

An important object of the invention is to provide an improved temple hinge joint for spectacles, wherein the temple will be held in normal position relative to the spectacle frame.

Another object is to provide such a device wherein the temple will be automatically retained in either open or closed position and held against accidental displacement.

Another object is to provide such a device which will be especially adaptable for application to non-metallic frames, such as tortoise shell or imitations thereof, so much in vogue at the present time.

Another object is to provide such a device which will be simple in construction, strong and durable in service, economical of manufacture, and an improvement in the art.

With these and other objects in view the invention resides in the novel features of construction, combination and arrangement of parts hereinafter set forth, illustrated in the accompanying drawings, and specifically pointed out in the appended claims.

In the accompanying drawings, wherein a preferred embodiment of the invention is shown by way of illustration, Figure 1 is a fragmentary perspective view of a spectacle having the improved temple connection comprising the invention;

Figure 2 is a horizontal sectional view through the temple joint and showing the temple in open position;

Figure 3 is a similar view showing the temple in closed position; and

Figure 4 is a transverse sectional view on the line 4—4 of Figure 2.

Referring now to the drawings, I have illustrated a lens rim 10 of a spectacle frame provided at its inner side with a bridge member 11 and at its outer side with the end piece 12, which may be of any ordinary or preferred construction. It is to be noted that the lens rim 10 and the end piece 12 are formed of a non-metallic material, such as tortoise shell or imitation thereof, but of course the invention is susceptible of application to metallic frames as well. The end piece member 12 is preferably slotted as at 13 for the reception of a metallic insert 14 which is anchored in place by means of suitable dowel pins 15. The metallic insert 14 is formed with a right angular extension 16 which is best shown in Figures 2 and 3, and which is disposed rearwardly from the end piece. Adjacent its rearward extremity the portion 16 has its edge recessed as at 17, which forms a cam surface 18 for a purpose to be hereinafter described.

A temple 19 is pivoted as at 20 to the metallic insert 14 in the end piece and its temple is preferably formed of the same material as the lens rim 10 and end piece 12. Adjacent its forward end the temple 19 is transversely slotted as at 21 and its inner side is provided with a longitudinally extending groove 22 which communicates with the slot 21. The bottom wall of the groove 22 is preferably tapered as at 23 and disposed within the groove is a spring 24 which has its rearward end 25 anchored in the temple 19. At its forward end the spring 24 is formed with an offset 26 which is operative in the slot 21 in the temple, it having a reduced extremity 27 which is adapted to frictionally engage the edge of the extension 16 of the metallic insert 14. By virtue of the fact that the bottom of the groove 22 is tapered the forward end of the spring member 24 will be yieldable and capable of assuming a position as illustrated by dotted lines in Figure 3.

It will be obvious that when the device is in use and the temple in its open position, as shown in Figure 2, the inner edge of the extremity 27 will contact with the cam surface 18 of the end piece, and will hold the temple in its normal position and prevent its accidental displacement. Also, when the temple is folded, as shown in Figure 3, the inner surface of the portion 27 will contact with the rearward surface of the end piece insert and tend to hold the temple in its normally closed position. As the temple 19 is moved about its pivot from the closed to the open position, the corner 28 of the end piece insert will contact with the inner surface of the portion 27 of the yieldable member and force the same outwardly. However, the temple will not maintain any intermediate position, although it will maintain selectively either the closed or open position.

From the foregoing it will be evident that

I have provided an improved temple connection for spectacles which will be simple in construction and efficient in use. The invention is susceptible of modifications, and the right is herein reserved to make changes in the form, proportions and arrangement of parts falling within the scope of the appended claims without departing from the spirit of the invention.

Having thus described my invention, I claim:

1. In a device of the character described, a lens rim having an end piece with a recess therein, an angled hinge member secured in the recess and having a piece projecting therebeyond, a temple having a recess into which the projecting member fits, means for pivoting the temple to the projecting member, and a blade spring secured in the temple recess and having an offset shoulder fitting against the end and one side of the projecting hinge member to hold the parts in resilient alignment when the temple is substantially normal to the lens rim and when the temple is substantially parallel with the lens rim.

2. In a device of the character described, a lens rim having an end piece with a recess therein, an angled hinge member secured in the recess and having a piece projecting therebeyond, a temple having a recess into which the projecting member fits, means for pivoting the temple to the projecting member, and a blade spring secured in the temple recess and having a right angled offset shoulder fitting against the end and one side of the projecting hinge member to hold the parts in resilient alignment when the temple is substantially normal to the lens rim and when the temple is substantially parallel to the lens rim.

3. In a device of the character described, a lens rim having an end piece with a recess therein, an angled hinge member secured in the recess and having a piece projecting therebeyond, a temple having a recess into which the projecting member fits, means for pivoting the temple to the projecting member, and a blade spring secured in the temple recess and having angled abutments engaging the end and one side of the projecting hinge member to hold the parts in resilient alignment when the temple is substantially normal to the lens rim and when the temple is substantially parallel with the lens rim.

ELMER L. SCHUMACHER.